Figure 1:
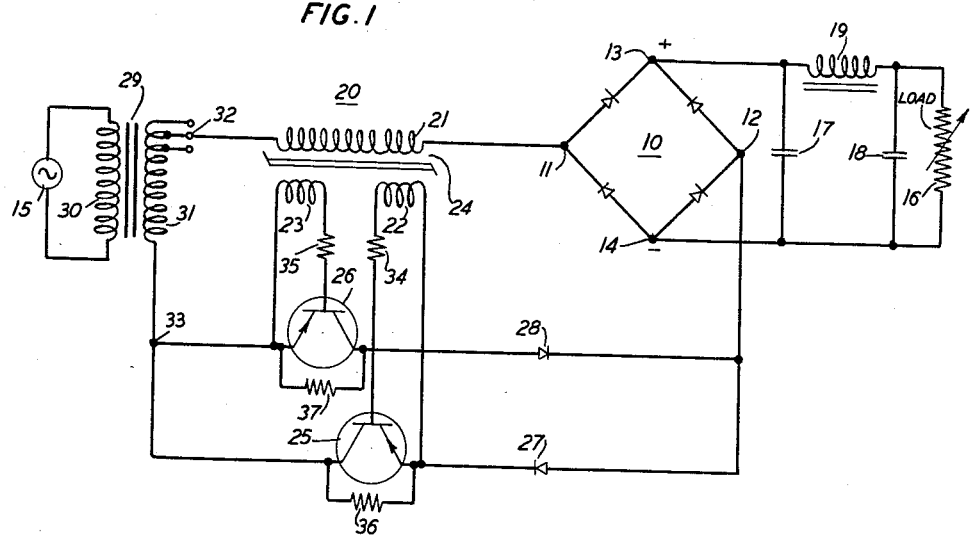

Feb. 5, 1963  S. P. JACKSON  3,076,925
CURRENT SUPPLY APPARATUS
Filed March 29, 1960

INVENTOR
S. P. JACKSON
BY
G. F. Heuerman
ATTORNEY

United States Patent Office 3,076,925
Patented Feb. 5, 1963

3,076,925
CURRENT SUPPLY APPARATUS
Stuart P. Jackson, Columbus, Ohio, assignor, by mesne assignments, to North Electric Company, Galion, Ohio, a corporation of Ohio
Filed Mar. 29, 1960, Ser. No. 18,423
7 Claims. (Cl. 323—22)

This invention relates to current supply apparatus and more particularly to apparatus for controlling the supply of rectified alternating current to a load.

An object of the invention is to provide improved apparatus comprising a saturable core transformer for supplying substantially constant current to a load.

In a specific embodiment of the invention, herein shown and described for the purpose of illustration, a rectifier is provided for rectifying alternating current supplied thereto and for supplying the rectified current from its output through a condenser input ripple filter to a load. There are provided for maintaining the average load current substantially constant a circuit comprising a transformer having a primary winding and two secondary windings wound on a saturable core of substantially square hysteresis loop magnetic material, two transistors each having a collector, an emitter and a base and two asymmetrically conducting elements. Current of one polarity is supplied from an alternating-current supply source having a substantially constant fundamental frequency to a first circuit comprising the transformer primary winding, the emitter-collector path of a first of the transistors, a first of the asymmetrically conducting elements and the rectifier input, all in series. Current of opposite polarity is supplied from the supply source to a second circuit comprising the transformer primary, the emitter-collector path of the second transistor, the second asymmetrically conducting element and the rectifier input, all in series. The base-emitter path of the first transistor is connected to a first of the secondary transformer windings and the base-emitter path of the second transistor is connected to the second secondary winding.

The voltages induced in the secondary windings cause the transistors to become substantially fully conducting alternately in succession to cause the transformer core to saturate alternately in opposite directions. When the transformer core saturates, the voltage across each transformer winding is reduced substantially to zero to cause the transistor which is conducting to become substantially non-conducting. As the amplitude of the alternating current supplied through the transformer primary increases, the time required for saturating the transformer core decreases and vice versa. If the current pulses supplied through the transformer primary to the rectifier input are plotted with the instantaneous values of current as ordinates and time as the abscissa, the area of the successive pulses will remain substantially constant irrespective of the peak amplitude of the alternating current flowing through the transformer primary. The constant area pulses are averaged by the rectifier-filter to maintain the rectified current supplied to the load substantially constant.

In a modified embodiment of the invention, alternating current is supplied to a current control circuit of the type described above from an alternating-current source having a substantially constant fundamental frequency. The voltage of the alternating-current source may be regulated to maintain it substantially constant or, as specifically described herein, there may be provided a regulator for maintaining substantially constant the average voltage of the successive positive and negative pulses of the alternating voltage. The saturable transformer having the core of substantially square hysteresis loop magnetic material used in the current control circuit is designed so that the core does not saturate when the load current is within a normal operating range including a predetermined maximum value. The load voltage is therefore maintained substantially constant over the normal operating range of load current. When the load current exceeds the maximum value, however, the core of the saturable transformer saturates during each half cycle period of the alternating current and the circuit functions to limit the load current to a constant value, as described above.

Figure 2:
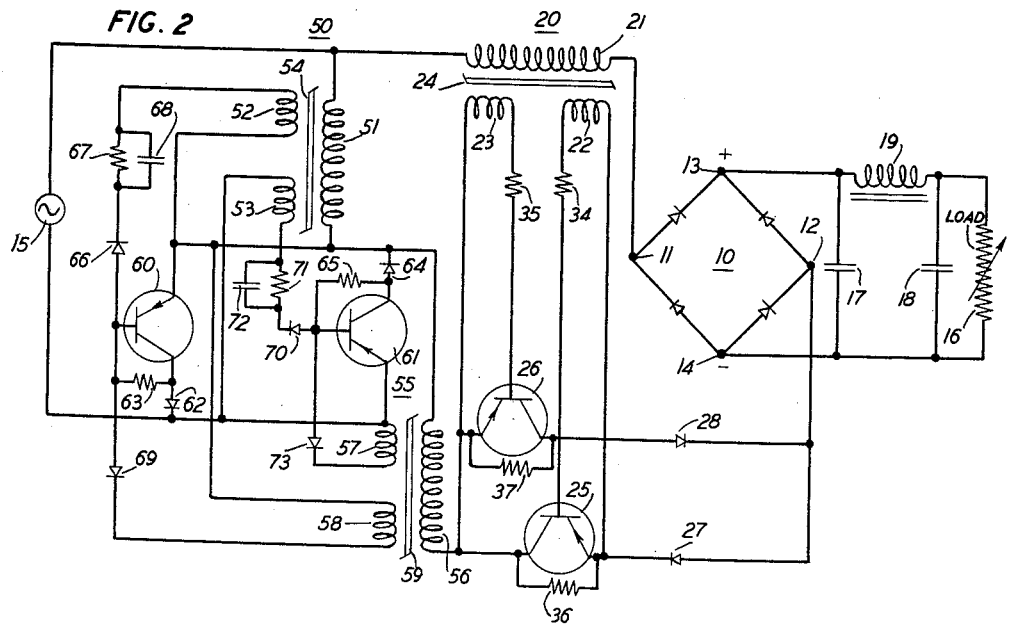

The invention will now be described in greater detail with reference to the accompanying drawing in which:

FIG. 1 is a schematic view of a current supply circuit embodying the invention; and FIG. 2 is a schematic view of a modification of the current supply circuit shown in FIG. 1.

Referring now to FIG. 1 of the drawing, there is provided apparatus comprising a bridge rectifier 10 having a pair of input terminals 11, 12 and positive and negative output terminals 13 and 14, respectively, for supplying rectified current from an alternating-current supply source 15 to a load 16 through a condenser input ripple filter having shunt condensers 17 and 18 and a series inductive reactor 19. The voltage and wave shape of the supply source 15 may vary but its fundamental frequency is substantially constant.

There is provided for maintaining the load current substantially constant a control circuit comprising a saturable transformer 20 having windings 21, 22 and 23 on a core 24 of saturable substantially square hysteresis loop magnetic material, a pair of p-n-p type transistors 25 and 26 each having an emitter, a collector and a base and a pair of asymmetrically conducting elements or rectifying elements 27 and 28. Current is supplied to the control circuit and rectifier input through an isolating transformer 29 having a primary winding 30 connected to the supply source 15 and a secondary winding 31.

A selectable terminal 32 of winding 31 is connected through the primary winding 21 of transformer 20 to rectifier input terminal 11. Two current paths are provided for connecting the other terminal 33 of transformer winding 31 to the rectifier input terminal 12. One of these paths comprising asymmetrically conducting element 27 and the emitter-collector path of transistor 25 is poled to conduct current only during half cycle periods of the supply source when terminal 32 is positive with respect to terminal 33. The other of the two paths comprising the emitter-collector path of transistor 26 and asymmetrically conducting element 28 is poled to conduct current only during half cycle periods when terminal 33 is positive with respect to terminal 32. There is provided a circuit comprising the emitter-base path of transistor 25, a resistor 34 and secondary transformer winding 22, all in series. A similar circuit is provided comprising the emitter-base path of transistor 26, a resistor 35 and secondary transformer winding 23, all in series. A resistor 36 is provided in a current path connecting the emitter and collector of transistor 25 and a resistor 37 is provided in a current path connecting the emitter and collector of transistor 26.

During a positive half cycle period of the alternating-current supply source when terminal 32 of transformer winding 31 is positive with respect to terminal 33, for example, and when the instantaneous voltage across transformer winding 31 increases to a value larger than the load voltage, current will flow from terminal 32 through a circuit comprising transformer winding 21, rectifier 10, ripple filter 17, 18, 19, load 16, asymmetrically conducting element 27 and resistor 36 to transformer terminal 33. It is required that the current flowing in this circuit when transistor 25 is in its cut-off or substantially non-conducting state be slightly larger than the exciting current of transformer 20. It will be seen, therefore, that the resistance 36 may represent the leakage resistance between the emitter and collector of transistor 25 or a combination of the leakage resistance and the resistance of an external resistor. If sufficient leakage current flows into the emitter and out of the collector of transistor 25 to meet the above requirement, the external resistor may be omitted. The resulting voltage induced in secondary winding 22 of saturable transformer 20 will cause current to flow from a terminal of winding 22 into the emitter and out of the base of transistor 25 and through resistor 34 to the other terminal of winding 22, thereby causing increased current to flow in the circuit comprising the emitter-collector path of transistor 25 and transformer winding 21 which, in turn, causes the voltage induced in secondary 22 to increase. Transistor 25 is thus made substantially fully conductive and sufficient current will flow in the circuit comprising transformer winding 21, the load circuit (rectifier 10, filter 17, 18, 19 and load 16), rectifying element 27 and the emitter-collector path of transistor 25 to cause the core 24 of transformer 20 to saturate.

As the transformer 20 approaches saturation, the secondary voltage across winding 22 begins to decrease to cause the emitter-base current of transistor 25 to decrease, thereby causing the resistance of the emitter-collector path of transistor 25 to increase. The resulting decrease of current in the circuit comprising the winding 21 and the emitter-collector path of transistor 25 causes the voltage induced in secondary winding 22 to reverse, that is, to make the base positive with respect to the emitter. The transistor 25 is thus cut off and the current flowing in the circuit comprising transformer primary 21, the load circuit, rectifying element 27 and the emitter-collector path of transistor 25 is reduced to a value which is negligibly small or substantially interrupted.

The transformer 20 remains saturated until, during the succeeding negative half cycle, current flowing from terminal 33 through a resistor 37, like resistor 36, the load circuit and primary winding 21 of the saturable transformer 20 increases to a value slightly larger than the exciting current of transformer 20. Then, transistor 26 is changed from a substantially cut-off state to a substantially fully conducting state, as described above for the positive half cycle operation.

If the peak amplitude of the current flowing through transformer primary 21 to the load circuit should increase due to an increase of voltage across the secondary 31 of transformer 29 or to a decrease of the resistance of the load 16, for example, the core 24 saturates earlier, and, therefore, the current pulse terminates earlier in a half cycle period of the alternating current. The area enclosed by a curve connecting the instantaneous current values and a time axis is the same for each current pulse supplied through the primary transformer winding 21 to the load circuit. The circuit comprising the rectifier 10 and the ripple filter 17, 18, 19 averages the current pulses supplied thereto through the winding 21 to maintain substantially constant the direct current supplied to the load 16.

It is preferable to use a condenser input ripple filter rather than an inductance input filter. The charge on the input condenser 17 of the filter, as shown, biases all of the rectifying elements of the bridge rectifier in the non-conducting direction. During each half cycle period of the alternating current, no current will flow through the winding 21 until the voltage across the secondary winding 31 increases to a value larger than the voltage across the condenser 17. If an inductance input filter were used, the voltage across the filter inductance due to decreasing current flow through the inductance would bias the rectifier elements of the bridge rectifier in the forward or conducting direction. Then, at the start of the next half cycle period, current would flow through a circuit comprising the winding 21 and the rectifier, but not through the load, until the current flowing through the winding 21 increased to a value equal to the current through the filter inductance in order to bias two of the rectifying elements of the bridge in the reverse or non-conducting direction. This increase of current flowing through the winding 21 represents ampere-seconds which are metered by the control circuit but which do not go to the load. Moreover, current flowing through the load as the result of energy stored in the inductance input filter does not flow through the transformer primary 21. The condenser input filter, as shown, is therefore preferred.

Resistors 34 and 35 must each be of large resistance value compared to the emitter-base resistance of transistors 25 and 26. The resistors serve to establish the secondary voltages of transformer 20. To supply a constant average current of each polarity to the rectifier input and, therefore, a constant direct current to the load 16 irrespective of ambient temperature changes, the resistors 34 and 35 should have a resistance value which is constant over the operating temperature range. If desired, however, there may be employed resistors which vary in a desired manner in response to temperature changes, for example, to obtain a load current which varies in response to temperature changes. While the average base current is constant, the effective base current varies as an inverse function of the angle at which the line current through the primary 21 is interrupted. Therefore, there may be employed resistors 34 and 35 the resistance of which vary in response to the effective current flowing through them to obtain a load current which varies in response to changes of peak amplitude of the line current flowing through the primary winding 21.

Referring now to FIG. 2 of the drawing, there is provided a current control circuit similar to the circuit shown in FIG. 1 and the corresponding parts of which are designated by the same numerals as are used in FIG. 1. The transformer 20 of FIG. 2 is designed so that its core 24 does not saturate when the current supplied to the load 16 is within a normal operating range including a predetermined maximum value. However, when the load current exceeds the maximum value of the normal operating range, the core 24 of the transformer 20 saturates during each half cycle period of the alternating current, as described above in connection with FIG. 1, to cause the load current to be limited to a substantially constant value.

Alternating current is supplied to the current control circuit from a voltage regulating circuit comprising a transformer 50 having windings 51, 52 and 53 on a core 54 of saturable substantially square hysteresis loop magnetic material, a transformer 55 having windings 56, 57 and 58 on a saturable core 59 of substantially square hysteresis loop magnetic material and a pair of p-n-p type transistors 60 and 61. One terminal of a constant frequency alternating-current supply source 15 is connected to a first terminal of transformer winding 51 and to a terminal of winding 21 of transformer 20 of the current control circuit. The second terminal of transformer winding 51 is connected through transformer winding 56 to the collector of transistor 25 and to the emitter of transistor 26 of the current control circuit.

The emitter of transistor 60 is connected to the common terminal of windings 51 and 56 and the collector of transistor 60 is connected through a rectifying element 62 to the lower terminal of the supply source 15, as viewed in the drawing. The collector of transistor 60 is also connected through a resistor 63 to the base of the transistor. The emitter of transistor 61 is connected to the lower terminal of the supply source 15 and its collector is connected through a rectifying element 64 to the common terminal of transformer windings 51 and 56. The collector of transistor 61 is also connected through a resistor 65 to the base of the transistor.

There is provided a series circuit which may be traced from the base of transistor 60 through a rectifying element 66, a resistor 67 shunted by a condenser 68, and transformer winding 52 to the emitter of transistor 60. A second circuit connecting the base and emitter of transistor 60 may be traced from its base, through a rectifying element 69 and transformer winding 58 to the emitter of the transistor. There is provided a circuit which may be traced from the base of transistor 61, through a rectifying element 70, a resistor 71 shunted by a condenser 72, and winding 53 to the emitter of transistor 61. A second circuit connecting the base and emitter of transistor 61 may be traced from its base, through a rectifying element 73 and transformer winding 57 to the emitter of the transistor.

The circuit comprising transformers 50 and 55 and transistors 60 and 61 is substantially like a circuit disclosed in a copending application of E. C. Olson, Serial No. 18,390, filed March 29, 1960. The circuit functions to supply to the current control circuit comprising transformer 20 and transistors 25 and 26 an alternating voltage the alternate positive and negative pulses of which have an average value which is maintained substantially constant. As a result, when the core 24 of transformer 20 is unsaturated, the direct voltage across the load 16 is maintained substantially constant.

During a positive half cycle period of the alternating-current supply source 15, for example, when the instantaneous voltage of the source increases to a value larger than the load voltage, current will flow through a circuit comprising winding 21 of transformer 20, rectifier 10, filter 17, 18, 19, load 16, rectifying element 27, into the emitter and out of the collector of transistor 25, winding 56 of transformer 55, into the emitter and out of the base of transistor 60, resistor 63 and rectifying element 62 in its forward or low resistance direction to the other terminal of the source 15. The resulting voltage induced in transformer winding 58 causes current to flow into the emitter and out of the base of transistor 60 and through rectifying element 69 in its forward direction. Transistor 60 is thus made substantially fully conductive and current will flow from the upper terminal of the source 15 through winding 51 of transformer 50, into the emitter and out of the collector of transistor 60 and through rectifying element 62 in its forward direction to the lower terminal of the source 15. The resulting voltage induced in transformer winding 52 will cause current to flow into the emitter and out of the base of transistor 60, through rectifying element 66 in its forward direction and through resistor 67. While the transistor 60 is conductive during a portion of a positive half cycle period of the supply source 15, substantially the entire voltage of the source appears across the transformer winding 51 and this voltage is impressed across the input of the current control circuit in series with the transformer winding 56. The core 59 of the transformer 55 will saturate to reduce the voltages across each of its windings substantially to zero and subsequently the core 54 of transformer 50 will saturate to reduce the voltages across each of its windings substantially to zero. The voltage due to the charging of condenser 68 is in opposing direction with respect to the voltage across winding 52 so that, when the voltage across winding 52 falls to zero, the transistor 60 becomes substantially non-conductive.

During each negative half cycle period of the supply source 15, conduction in transistor 61 is similarly initiated due to the current flow in winding 56 and the resulting voltage from winding 57 impressed upon the emitter-base circuit of transistor 61. The transistor 61 is held conductive by the voltage induced in transformer winding 53 because of the current from the supply source 15 flowing in a circuit comprising the emitter-collector path of transistor 61, rectifying element 64 and winding 51, all in series. When the core of transformer 50 saturates, the voltage across winding 53 is reduced substantially to zero with the result that conduction in transistor 61 is interrupted.

The peak amplitude of the successive voltage pulses thus produced across the transformer winding 51 and impressed upon the input of the current control circuit increases as the peak voltage of the supply source 15 increases and vice versa. However, the core 54 saturates earlier, and, therefore, the voltage pulse across winding 51 terminates earlier, in a half cycle period when the supply voltage is large than when the supply voltage is relatively small. The area enclosed by a curve connecting the instantaneous voltages and the time axis is the same for each voltage pulse across the winding 51. The circuit comprising the rectifier 10 and filter 17, 18, 19 averages the voltage impressed upon the rectifier-filter circuit to maintain the load voltage substantially constant when the load current is insufficient to cause the core 24 of transformer 20 to saturate. When the load current is sufficiently large to cause saturation of the core 24, the current control circuit functions to maintain a constant current through the load 16, as explained above.

Instead of using p-n-p type transistors 25, 26, 60 and 61, as shown in the drawing, of course n-p-n type transistors may be used and the circuit connections appropriately changed so that current flows into the base and collector electrodes and out of the emitter electrode.

What is claimed is:

1. Apparatus for supplying to a load current from a source of alternating current having a fundamental frequency which is substantially constant comprising a transformer having a primary and a secondary on a saturable core of substantially square hysteresis loop magnetic material, a transistor having an emitter, a collector and a base, a circuit comprising said current source, said primary, the emitter-collector path of said transistor and said load all in series, and means comprising said secondary for making said transistor substantially fully conducting in response to increasing current in said circuit during a half cycle period of said alternating current and for subsequently during said half cycle period making said transistor substantially non-conducting in response to decreasing current in said circuit.

2. Apparatus for supplying to a load current from a source of alternating current having a fundamental frequency which is substantially constant comprising a transformer having a primary and a first and a second secondary on a saturable core of substantially square hysteresis loop magnetic material, a first and a second transistor each having a collector, an emitter and a base, a first circuit comprising said current source, said primary, the emitter-collector path of said first transistor and said load, all in series, a second circuit comprising said current source, said primary, the emitter-collector path of said second transistor and said load, all in series, the emitter-collector path of said first transistor being poled to conduct current of one polarity only and the emitter-collector path of said second transistor being poled to conduct current of opposite polarity only, a third circuit comprising said first secondary and the emitter-base path of said transistor, and a fourth circuit comprising said second secondary and the emitter-base path of said second transistor.

3. Apparatus for supplying current to a load circuit from a supply source of alternating current having a substantially constant fundamental frequency comprising a transformer having a first, a second and a third winding on a saturable core of substantially square hysteresis loop magnetic material, a first and a second transistor each having an emitter, a collector and a base, a first and a second asymmetrically conducting element, a first and a second resistor each having a resistance which varies in response to temperature change, a first circuit comprising said current source, said first winding, the emitter-collector path of said first transistor, said first asymmetrically conducting element and said load circuit, all in series, a second circuit comprising said current source, said first winding, the emitter-collector path of said second transistor, said second asymmetrically conducting element and said load circuit, all in series, the emitter-collector path of said first transistor and said first asymmetrically conducting element being poled to conduct current of one polarity only and the emitter-collector path of said second transistor and said second asymmetrically conducting element being poled to conduct current of opposite polarity only, a third circuit comprising said second winding, said first resistor and the emitter-base path of said first transistor, all in series, and a fourth circuit comprising said third winding, said second resistor and the emitter-base path of said second transistor, all in series.

4. Current supply apparatus for supplying current from an alternating current supply source to a load circuit including a load which may vary, a transformer having a primary and a first and a second secondary on a saturable core of substantially square hysteresis loop magnetic material, a first and a second transistor each having an emitter, a collector and a base, a source of voltage regulated alternating current having a substantially constant frequency, means for supplying current from said source to a circuit comprising in series said primary, said load circuit and two parallel branch paths comprising the collector-emitter paths of said transistors respectively, said transistors respectively being poled to conduct current of opposite polarity, said transformer being unsaturated when the load current is within a normal operating range including a predetermined maximum value, and means responsive to voltages across said secondaries for making said transistors substantially fully conducting during alternate half cycle periods of said alternating current respectively when the transformer is unsaturated and for substantially interrupting conduction through said transistors during alternate half cycle periods respectively when the load current exceeds said maximum value to cause said transformer to saturate during each half cycle period.

5. Apparatus for supplying current to a load which may vary from a voltage regulated alternating-current source the frequency of which is substantially constant comprising a transformer having a winding on a saturable core of substantially square hysteresis loop magnetic material, a transistor having an emitter, a collector, and a base, means for transmitting current from said source through a circuit comprising said winding, the emitter-collector path of said transistor and said load, all in series, means responsive to increase of current in said circuit for making said transistor substantially fully conducting, said transformer core remaining unsaturated as long as the load current is within an operating range including a predetermined maximum to thereby cause the load voltage to be maintained substantially constant, and means for maintaining the load current substantially constant when the load current exceeds said maximum comprising means responsive to saturation of said core for making said transistor substantially non-conductive.

6. Apparatus for supplying to a load current from a source of alternating current having a fundamental frequency which is substantially constant comprising a first, a second and a third transformer each having a primary and a secondary on a saturable core of substantially square hysteresis loop magnetic material, a first and a second transistor each having an emitter, a collector and a base, a first circuit comprising said current source, the primary of said first transformer, said load, the emitter-collector path of said first transistor, the primary of said second transformer, and the emitter-collector path of said second transistor, all in series, a resistor in a current path connecting the collector and base of said second transistor, a second circuit comprising said current source, the primary of said third transformer and the emitter-collector path of said second transistor, all in series, a third circuit comprising the secondary of said first transformer and the emitter-base path of said first transistor, a fourth circuit comprising the secondary of said second transformer and the emitter-base path of said second transistor, and a fifth circuit comprising the secondary of said third transformer and the emitter-base path of said second transistor.

7. Apparatus for supplying current to a load circuit from a supply source of alternating current having a substantially constant fundamental frequency comprising a first, a second and a third transformer each having a primary and a first and a second secondary on a core of substantially square hysteresis loop magnetic material, a first, a second, and a third and a fourth transistor each having an emitter, a collector and a base, a first, a second, a third, a fourth, a fifth, a sixth, a seventh and an eighth rectifying element, a first resistor connecting the emitter and collector of said first transistor, a second resistor connecting the emitter and collector of said second transistor, a third resistor connecting the collector and base of said third transistor, a fourth resistor connecting the collector and base of said fourth transistor, a first circuit comprising said source, the primary of said first transformer, said load circuit, said first rectifying element, the emitter-collector path of said first transistor, the primary of said second transformer, the emitter-base path of said third transistor, said third resistor, and said third rectifying element, all in series, a second circuit comprising said source, the emitter-base path of said fourth transistor, said fourth resistor, said fourth rectifying element, the primary of said second transformer, the emitter-collector path of said second transistor, said second rectifying element, said load circuit and the primary of said first transformer, all in series, a third circuit comprising the primary of said third transformer, the emitter-collector path of said third transistor and said third rectifying element, all in series, a fourth circuit comprising the emitter-collector path of said fourth transistor, said fourth rectifying element and the primary of said third transformer, all in series, means for connecting the base-emitter paths of said first and second transistors to the secondaries respectively of said first transformer, means comprising said fifth and sixth rectifying elements for connecting the emitter-base paths of said third and fourth transistors to the secondaries respectively of said second transformer, and means comprising said seventh and eighth rectifying elements for connecting the emitter-base paths of said third and fourth transistors to the secondaries respectively of said third transformer.

References Cited in the file of this patent

UNITED STATES PATENTS

| Re. 20,335 | Lord | Apr. 20, 1937 |
| 2,726,356 | Rockafellow | Dec. 6, 1955 |
| 2,772,370 | Bruce et al. | Nov. 27, 1956 |
| 2,806,197 | Rockafellow | Sept. 10, 1957 |

FOREIGN PATENTS

| 564,582 | Canada | Oct. 14, 1958 |